United States Statutory Invention Registration [19]

[11] Reg. Number: H5

Mukherjee

[45] Published: Dec. 3, 1985

[54] PRESSURE-FIRED FLUIDIZED-BED BOILER INSTALLATION

[75] Inventor: Dilip Mukherjee, Fislisbach, Switzerland

[73] Assignee: BBC Brown, Boveri & Company Ltd., Baden, Switzerland

[21] Appl. No.: 748,949

[22] Filed: Jun. 26, 1985

[30] Foreign Application Priority Data

Jun. 29, 1984 [CH] Switzerland ..... 3147/84

[51] Int. Cl.[4] ..... F02G 1/00

[52] U.S. Cl. ..... 60/39.182; 60/39.464

*Primary Examiner*—Deborah L. Kyle
*Assistant Examiner*—Richard W. Wendtland
*Attorney, Agent, or Firm*—Burns, Doane, Swecker & Mathis

[57] ABSTRACT

The pressure-fired fluidized-bed boiler installation with a gas turbine set driven by the flue gases has, in the main air duct (8), a preheating burner (10) which heats the still cold fluidized-bed boiler (1) and a part of the flue gas duct (12) to a temperature above the dew point. Air branched off from the main air duct (8) is heated in a heat exchanger (20) and used for heating up the turbine (5) driven by the motor (6) and the remaining parts of the installation, through which flue gas flows.

2 Claims, 1 Drawing Figure

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

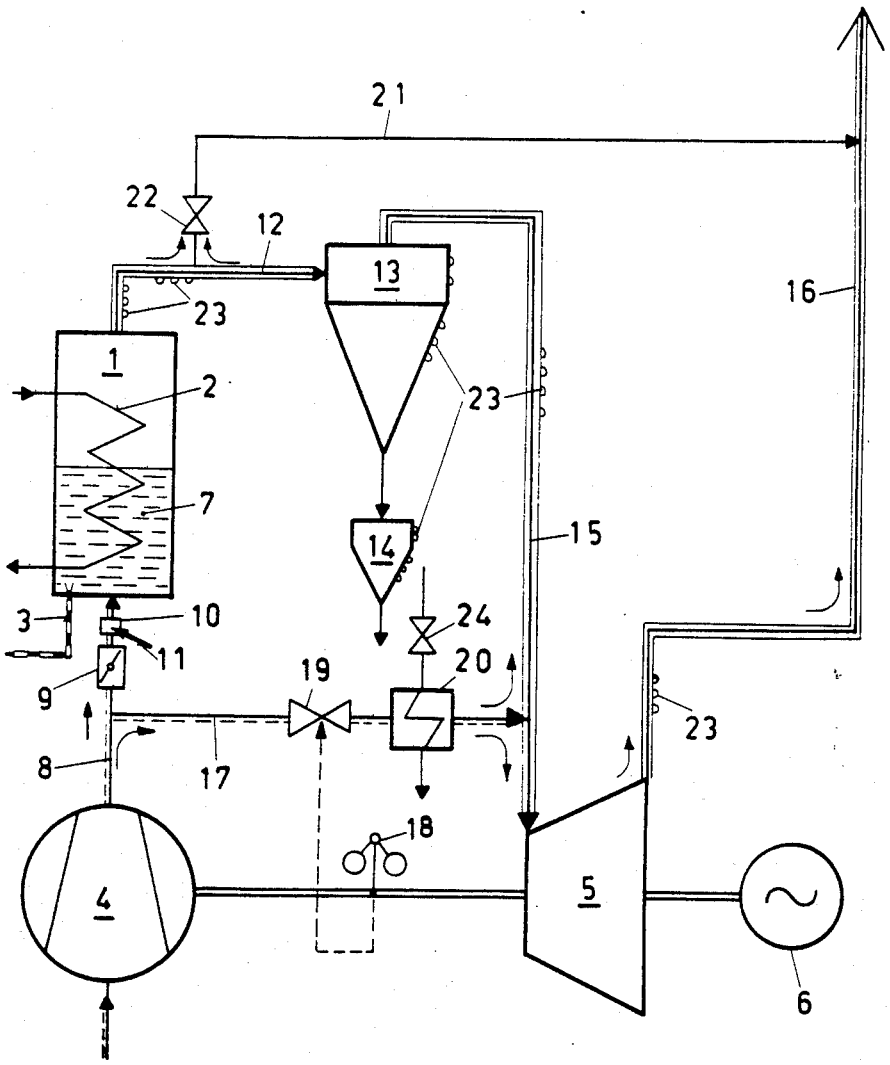
21
22
12
13
16
23
1
2
23
7
15
14
3
10
24
11
20
19
9
23
8
17
18
4
5
6

PRESSURE-FIRED FLUIDIZED-BED BOILER INSTALLATION

The present invention relates to a pressure-fired fluidised-bed boiler installation according to the preamble of patent claim 1.

In an endeavour to obtain better thermal utilisation of coal as the fuel for industrial furnace installations, numerous concepts of fluidised-bed furnaces have been proposed in recent years. As far as is known, however, proposals in this direction, especially for pressure-fired fluidised-bed boiler installations for power stations, have not yet gone beyond the project stage.

The individual problems, which must also be solved before fluidised-bed furnaces are feasible in practice, include the provision of a device which prevents the incrustation which is caused by the mixing of condensate from still cold flue gases with dust deposits which have settled during operation of the installation on the components along which the flue gas flows. The flue gases from a pressure-fired fluidised-bed boiler installation contain a considerable quantity of dust which must be precipitated in a dust precipitation device to such an extent that corrosion and erosion of the components are restricted to a technically and economically acceptable level. A part of the fine dust which still remains in the flue gases after this precipitation forms the said deposits, especially in the pipes and filters and on the blading of the gas turbine for driving the blower which generates the compressed combustion air for the boiler.

When the cold boiler installation is started up after a prolonged interruption in operation, the formation of condensate in the start-up phase must therefore be avoided. Otherwise, the tacky film, which is formed by bonding of the condensate, separating out of the still insufficiently warm flue gases, to the fine dust deposits and which is very difficult to remove, would in the course of time impair the functioning of the installation, in particular that of the shut-off elements and the turbine blading. To prevent this, the components of the installation according to the invention, as characterised in the patent claims, are preheated before starting up to such an extent that the water vapour present in the flue gases cannot cool down to a temperature below the dew point and condense.

The single FIGURE of the drawing diagrammatically shows a fluidised-bed boiler installation with an illustrative example of a preheating device according to the invention.

In a fluidised-bed boiler 1 pressure-fired with small coal, steam is generated on a boiler heating surface 2, for example for a stem power station. The small coal is jetted into the pressurised firing space by means of a feeding device 3. The pressure is generated by an air compressor 4 which is coupled to a gas turbine 5 driven by the flue gases. In addition, the turbine 5 is also coupled to a generator 6 which can also be run as a motor.

In normal operation, with the installation warm, the compressor 4 delivers air under pressure into the boiler in which the small coal is burned in a fluidised bed 7. In normal operation, that is to say at a steady operating temperature, the compressed air passes through a main air duct 8 via a control valve 9 into a preheating burner 10 which can be heated by oil or gas. If the bed temperature is insufficient for starting up, heating to the requisite temperature is effected with oil or gas fed via a fuel line 11.

The flue gases escaping from the boiler 1 in normal operation pass through a flue gas duct 12 into a dust precipitation device with a dust filter 13 and a dust discharge lock 14, from where the dust precipitated in the filter is discharged into the open. The flue gases purified to a high degree in the dust precipitation device flow through a further flue gas duct 15 into the turbine 5, where they produce work, whereupon they are discharged through an off-gas duct 16 into the open.

Upstream of the control valve 9, a heating air duct 17 branches off from the abovementioned main air duct 8 and leaves via a control valve 19 dependent on a governor 18 into a heat exchanger 20, which can be heated preferably by steam or electrically, and further into the flue gas duct 15 in the vicinity of the exit of the latter into the turbine 5.

A heating air discharge line 21 with an isolation valve 22 branches off from the flue gas duct 12 and leads into the off-gas duct 16. As far as is possible and necessary, steam-heated or electric heating coils 23 are provided on the components of the installation through which heating air flows, such as the flue gas ducts 12 and 15, the dust filter 13 and the lock 14 as well as the off-gas duct 16, in order to keep the heating-up period of the installation as short as possible.

During heating-up, the turbine 5 and the compressor 4 are driven by the generator 6, connected as a motor, at a speed of rotation which is greatly reduced as compared with the nominal speed of rotation in normal operation, preferably at about 30% of the nominal speed of rotation. The air delivered by the compressor is divided into two part streams by appropriate setting of the control valves 9 and 19. The main stream flows through the main air duct 8 via the control valve 9 into the preheating burner 10, the combustion gases of which heat the cold fluidised bed, the boiler 1 and that part of the flue gas duct 12 which adjoins the boiler 1 up to the isolation valve 22. The latter is open, so that the cooled combustion gases flow out via the heating air discharge line 21 into the off-gas duct 16. The smaller part stream flows through the heating air line 17 via the open control valve 19 into the heat exchanger 20, the throughput of which can be matched to the desired heat release to the heating air by means of a control valve 24, and onwards into the flue gas duct 15 between the dust precipitation device and the turbine 5. A part of this heating air flowing into the flue gas duct 15 flows through and heats the turbine driven by the motor 6, whereupon it leaves the installation through the off-gas duct 16. The other part of the heating air takes a path through the flue gas duct 15 back into the dust filter 13 and the flue gas duct 12 between the boiler 1 and the filter 13 and passes via the valve 22 and the heating air discharge line 21 likewise into the off-gas duct 16 and from there into the open. The controller 19 regulates the air flow through the line 17 as a function of the speed of rotation of the turbine rotor. In order to obtain refined control, the servo motor of the control valve can also be subject to suitable temperature signals from other points in the heating air circulation, in order to ensure that the temperature is everywhere above the dew point.

After all the parts of the installation which have to be preheated have reached a temperature above the dew point, the control valves 19 and 22 in the heating air duct 17 and the heating air discharge line 21 respectively are closed and the heat exchanger 20 is switched off. The installation can then start power operation with small coal firing.

I claim:

1. Pressure-fired fluidised-bed boiler installation, with a fluidised-bed boiler fired with small coal for generating steam for energy, heating or process purposes, with a gas turbine set which is coupled to a generator, which can be connected as an electric motor, and the compressor of which is connected via a main air duct to the fluidised-bed boiler and the gas turbine of which is connected via a flue gas duct with an interposed dust precipitation device to the fluidised-bed boiler, the dust precipitation device having a dust filter and a dust discharge lock, and also with an off-gas duct for discharging the flue gases, expanded in the gas turbine, into the open, characterised by a preheating device which is intended to preheat to a temperature above the dew point of water those parts of the installation which are at risk, when the boiler installation is started up after an interruption in operation, due to mixing of the water vapour condensing out of the flue gases with deposits of fine dust, and which essentially comprises the following components:

a preheating burner (10) located in the main air duct (8) upstream of the fluidised-bed boiler (1), a control valve (9) in the main air duct (8) immediately upstream of the preheating burner (10), a heating air duct (17) which branches off the main air duct (8) and leads into the flue gas duct (15) located between the dust precipitation device (13+14) and the gas turbine (5), a control valve (19) in the heating air duct (17), a heat exchanger (20), provided between the control valve (19) and the flue gas duct (15), for heating the air flowing through the heating air duct (17), and a heating air discharge line (21) which connects the flue gas duct (12) immediately adjoining the fluidised-bed boiler (1) to the off-gas duct (16).

2. Pressure-fired fluidised-bed boiler installation according to claim 1, characterised by heating coils (23) for additional heating of parts (12, 13, 14, 15, 16) of the installation, and a governor (18) which emits signals, depending on the speed of rotation of the gas turbine set (4+5+6), to the final control element of the control valve (19).

* * * * *